United States Patent Office 2,819,324
Patented Jan. 7, 1958

2,819,324

PRODUCTION OF DI-ALKYLNAPHTHALENES BY DISPROPORTIONATION OF ALKYL-NAPHTHALENES

David A. McCaulay, Chicago, Ill., and Arthur P. Lien, Highland, Ind., assignors to Standard Oil Company, Chicago, Ill., a corporation of Indiana No Drawing. Application August 3, 1954
Serial No. 447,680

10 Claims. (Cl. 260—671)

This invention relates to the disproportionation of monoethylnaphthalenes to diethylnaphthalenes and other conversion products.

An object of this invention is a process for the preparation of diethylnaphthalene. Another object is a process for the disproportionation of monoethylnaphthalene to diethylnaphthalene. A particular object is the preparation of 2,6-diethylnaphthalene, 2,7-diethylnaphthalene and 2,3-diethylnaphthalene by the disproportionation of monoethylnaphthalene. Other objects will become apparent in the course of the detailed description.

In the process, monoethylnaphthalene is contacted, under substantially anhydrous conditions, with liquid HF and $BF_3$ treating agent. Sufficient liquid HF must be used to form a distinct acid phase and a catalytically effective amount of $BF_3$ is used. In general, at least about 0.3 mol of $BF_3$ is used per mol of monoethylnaphthalene charged. The contacting is carried out at a temperature between about −20° C. and about +25° C. for a time sufficient to effect the formation of diethylnaphthalene. Diethylnaphthalene and other reaction products are recovered from the HF—$BF_3$ acid phase.

The charge to the process is a monoethylnaphthalene, for example, α-ethylnaphthalene. It is preferred to operate with monoethylnaphthalene which is substantially pure. A substantially pure ethylnaphthalene charge will be dissolved in the HF—$BF_3$ agent to form an essentially single homogeneous phase wherein the hydrocarbons are either present in the form of an HF—$BF_3$ complex or in physical solution.

The process is carried out under substantially anhydrous conditions in order to minimize the formation of $BF_3$ hydrates. Therefore, substantially anhydrous liquid hydrogen fluoride is used, which substantially anhydrous liquid hydrogen fluoride contains not more than about 3% of water. The commercial grade of anhydrous hydrofluoric acid is suitable for use in the process.

Naphthalene and alkylnaphthalenes form a complex with HF and $BF_3$ which is believed to contain 1 mole of $BF_3$ and 1 mole of HF per mole of naphthalene or alkylnaphthalene. Sufficient liquid HF must be present not only to form the complex but also to dissolve the complex. In general, there is utilized at least about 3 moles of liquid HF per mole of ethylnaphthalene charged. More than this amount may be used, for example, 50 moles or more. It is preferred to use between about 7 and 15 moles of liquid HF per mole of ethylnaphthalene charged.

In addition to the liquid HF there must be present in the contacting zone boron trifluoride in a catalytically effective amount. That is, enough $BF_3$ must be present to cause the conversion of ethylnaphthalene to diethylnaphthalene and other reaction products. In general, at least about 0.3 mole of $BF_3$ are used per mole of ethylnaphthalene charged. The yield of the desired diethylnaphthalene is maximized by operation under conditions such that all of the charge is taken into the liquid HF—$BF_3$ acid phase. In order to attain this condition, at least about 1 mole, for example 0.8, of $BF_3$ must be used per mole of ethylnaphthalene present in the charge. Preferably 1 mole or more of $BF_3$ is used per mole of ethylnaphthalene charged.

The process is a liquid phase operation. It is to be understood that a gaseous $BF_3$ phase may also be present, but it is preferred to operate under conditions of pressure such that essentially no separate $BF_3$ phase exists.

The HF—$BF_3$ agent and the monoethylnaphthalene are contacted at a temperature such that conversion will take place in a practical length of time. However, the temperature of operation must not be so high that side reactions and decomposition reactions become the predominant reaction. The contacting is carried out at a temperature between about −20° C. and about +25° C. Preferably the temperature is about 5° C.

The contacting must be carried out for a time at least sufficient to obtain some conversion of ethylnaphthalene to diethylnaphthalene. The lower the temperature of contacting, the longer the time necessary. At the higher temperatures, the reaction time must be limited to avoid side reactions and decomposition. In general, over the temperature range of −20° C. to +25° C. suitable time of contacting for attainment of substantial yields of diethylnaphthalene is between about 5 minutes and about 12 hours, the longer times corresponding to the lower temperatures. At the preferred temperature of about 5° C., a time of about 15 minutes is sufficient.

It has been found that isopropylnaphthalene and secondary butylnaphthalene disproportionate in the presence of liquid HF—$BF_3$ agent to the corresponding dialkylnaphthalene and also trialkylnaphthalene. However, the isopropylnaphthalene and sec-butylnaphthalene processes must be carried out at temperatures lower than those for the ethylnaphthalene process. The temperature of contacting is between about −50° C. and about +15° C. when the charge consists of isopropylnaphthalene or sec-butylnaphthalene. At these temperatures, the time of contacting is between about 5 minutes and about 12 hours, the longer times corresponding to the lower temperatures. The preferred temperature of contacting is about 0° C. and the corresponding time is about 15 minutes.

The hydrocarbon reaction product mixture may be recovered from the acid phase by various methods. For laboratory work, the simplest and most suitable procedure consists of adding the acid phase to crushed ice which is maintained at Dry Ice-acetone temperature. Also, the acid phase may be added to cold aqueous alkaline solution such as sodium hydroxide or ammonia. The use of a cold quenching medium minimizes rearrangement reactions. The hydrocarbons are found as an oil layer above the aqueous layer. The oil layer is then separated by decantation and treated with aqueous alkaline solution to remove occluded HF and $BF_3$.

A more economical procedure is one wherein the HF and $BF_3$ are removed from the acid phase by distillation. In order to avoid side reactions, the distillative removal of HF and $BF_3$ must be carried out at a temperature lower than the maximum tolerable in the contacting zone. The HF and $BF_3$ may be readily removed from an acid phase containing diethylnaphthalene by vacuum distillation.

EXAMPLES

The results obtainable by the invention are illustrated by several examples set out below. The runs were carried out using a steel reactor provided with a 1725 R. P. M. stirrer. The order of addition of materials to the reactor was: (1) alkylnaphthalene, technical grade, (2) commercial grade anhydrous liquid HF and (3) commercial grade BF₃. The contents of the reactor were agitated during the addition of the HF and BF₃; the agitation was continued while the reactor was brought to the desired contacting temperature and maintained during the contacting time. The contents of the reactor were withdrawn into a vessel filled with crushed ice. An upper hydrocarbon layer formed above a lower aqueous layer. The hydrocarbon layer was decanted and washed with dilute ammonium hydroxide solution to remove HF and BF₃. The neutral hydrocarbons were water washed to remove traces of ammonium hydroxide.

The reaction product hydrocarbons were fractionated in a laboratory distillation column provided with about 30 theoretical plates. Each product fraction was analyzed by a combination of boiling point, specific gravity, refractive index, and ultraviolet and infrared technique. The infrared spectrometry results are considered to be a more reliable indication of the composition of the hydrocarbons than the physical characteristics. This is true because the physical characteristics information on this class of alkylnaphthalenes is relatively unreliable and it is extremely difficult to separate the various isomers.

Tests were carried out utilizing β-ethylnaphthalene, a mixture of amylnaphthalene isomers, β-methylnaphthalene and naphthalene itself. The results of these tests are set out in Table I.

In runs 3 and 4, the bomb was pressured with hydrogen in an attempt to minimize side reactions. Despite these precautions, the results show that naphthalene (run No. 3) was almost completely converted, at 23° C. and 3 hours time, to tar. Methylnaphthalene (run No. 4), on the other hand, was only about one-half converted in 4 hours at 23° C. Of the portion that was converted, about one-half was tar and about one-half was a mixture of hydrocarbons boiling over the range of 250°–350° C. Amylnaphthalene (run No. 2) was about one-half converted in 30 minutes at 22° C. The reaction product mixture contained some alkylbenzenes, a goodly amount of naphthalene, and a mixture of materials higher boiling than amylnaphthalene, which mixture is believed to contain diamylnaphthalene, tetralins and tar. Tar is used herein in the sense of higher condensation products of naphthalene cracking.

Run No. 1 shows that ethylnaphthalene at 18° C. and 30 minutes disproportionates to diethylnapthalenes and only a slight amount of tar. In addition to the diethylnaphthalene and naphthalene produced, an appreciable amount of material boiling between 109° C. and 215° C. was obtained; this fraction was analyzed to be about 60% toluene. Infrared analysis of the diethylnaphthalene product showed it to be a mixture of 2,6-diethylnaphthalene, 2,7-diethylnaphthalene and some 2,3-diethylnaphthalene.

Table I

| Run No. | 1 | 2 | 3 | 4 |
|---|---|---|---|---|
| Charge | β-Ethylnaphthalene | Amylnaphthalene | Naphthalene | β-Methylnaphthalene |
| Temperature, °C | 18 | 22 | 23 | 23 |
| Time, Minutes | 30 | 30 | 180 | 240 |
| Hydrogen pressure, p. s. i. g. | | | 1300 | 1700 |
| HF: Charge, mole ratio | 21.7 | 14.0 | 12.8 | 13.9 |
| BF₃: Charge, mole ratio | 2.33 | 1.35 | 1.11 | 1.39 |
| Product Distribution, wt. percent: | | | | |
| Low boiling | a 13 | 2 | | 2 |
| Naphthalene | 9 | 13 | | |
| Alkylnaphthalene | 63 | 40 | | 53 |
| Dialkylnaphthalene | 10 | } 45 | } b 9 | } b 21 |
| Higher boiling | | | | |
| Tar c | 5 | | 91 | 24 | a 109° C.–215° C. (60% Toluene).
b 250° C.–350° C.
c Hard, black solid.

Thus having described the invention, what is claimed is:

1. A process which comprises contacting, under substantially anhydrous conditions, monoethylnaphthalene with liquid HF, in an amount of at least about 3 moles per mole of ethylnaphthalene, and BF₃, in an amount of at least about 0.3 mole per mole of monoethylnaphthalene, at a temperature between about −20° C. and +25° C. for a time sufficient to effect the formation of diethylnaphthalene and removing HF and BF₃ to recover a reaction product mixture containing diethylnaphthalene.

2. The process of claim 1 wherein the BF₃ amount is at least about 1 mole per mole of monoethylnaphthalene.

3. The process of claim 1 wherein the liquid HF amount is between about 7 and 15 moles per mole of monoethylnaphthalene.

4. The process of claim 1 wherein the time is between about 5 minutes and about 12 hours, the longer times corresponding to the lower temperatures.

5. A process which comprises (1) contacting, under substantially anhydrous conditions, a monoethylnaphthalene with liquid HF, between about 7 and 15 moles, and BF₃, about 1 mole, respectively, per mole of said monoethylnaphthalene, to form a single essentially homogeneous liquid phase in the contacting zone, carrying out said contacting at a temperature of about 5° C. for a time of about 15 minutes, (2) removing HF and BF₃ to recover a reaction product mixture of hydrocarbons and (3) recovering diethylnaphthalenes from said mixture.

6. A process which comprises contacting, under substantially anhydrous conditions, mono-secondary-alkylnaphthalene from the class consisting of isopropyl and sec-butyl with liquid HF, in an amount of at least 3 moles per mole of said sec-alkylnaphthalene, and BF₃ in an amount of at least about 0.3 mole per mole of said sec-alkylnaphthalene, at a temperature between about −50° C. and +15° C. for a time sufficient to effect the formation of di-sec-alkylnaphthalene and removing HF and BF₃ to recover a product mixture containing di-sec-alkylnaphthalene.

7. The process of claim 6 wherein the BF₃ amount is at least about 1 mole per mole of mono-sec-alkylnaphthalene.

8. The process of claim 6 wherein the liquid HF amount is between about 7 and 15 moles per mole of mono-sec-alkylnaphthalene.

9. The process of claim 6 wherein the time is between about 5 minutes and 12 hours, the longer times corresponding to the lower temperatures.

10. A process which comprises (1) contacting, under substantially anhydrous conditions, only one type of mono-secondary-alkylnaphthalene from the class consisting of isopropyl and sec-butyl with liquid HF, between about 7 and 15 moles, and $BF_3$, about 1 mole, respectively, per mole of mono-sec-alkylnaphthalene, to form a single essentially homogeneous phase in the contacting zone, carrying out said contacting at a temperature of about 0° C. for a time of about 15 minutes, (2) removing HF and $BF_3$ to recover a reaction product mixture of hydrocarbons and (3) recovering di-sec-alkylnaphthalenes from said mixture.

References Cited in the file of this patent

UNITED STATES PATENTS

| | | |
|---|---|---|
| 2,416,184 | Lee et al. | Feb. 18, 1947 |
| 2,564,073 | Lien et al. | Aug. 14, 1951 |
| 2,615,056 | Nickels | Oct. 21, 1952 |
| 2,617,838 | Nickels | Nov. 11, 1952 |
| 2,644,017 | McCaulay et al. | June 30, 1953 |